United States Patent
Lu et al.

(10) Patent No.: US 9,269,953 B2
(45) Date of Patent: Feb. 23, 2016

(54) ELECTRODE FORMING PROCESS FOR METAL-ION BATTERY WITH HEXACYANOMETALLATE ELECTRODE

(75) Inventors: Yuhao Lu, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 944 days.

(21) Appl. No.: 13/432,993

(22) Filed: Mar. 28, 2012

(65) Prior Publication Data

US 2013/0260222 A1 Oct. 3, 2013

(51) Int. Cl.
| | |
|---|---|
| *H01M 4/38* | (2006.01) |
| *H01M 10/04* | (2006.01) |
| *H01M 4/29* | (2006.01) |
| *H01M 4/58* | (2010.01) |
| *H01M 4/04* | (2006.01) |
| *H01M 10/054* | (2010.01) |

(52) U.S. Cl.
CPC ............. *H01M 4/58* (2013.01); *H01M 4/0438* (2013.01); *H01M 10/054* (2013.01); *H01M 4/0459* (2013.01)

(58) Field of Classification Search
CPC ....... H01M 4/134; H01M 4/38; H01M 4/661; H01M 4/131; H01M 4/667; H01M 4/045; H01M 10/04; H01M 4/29
USPC ............... 205/57, 59; 429/231.95, 231.6, 211
See application file for complete search history.

(56) References Cited

U.S. PATENT DOCUMENTS

2012/0328936 A1 12/2012 Wessells et al.

FOREIGN PATENT DOCUMENTS

| EP | 0131392 | 1/1985 |
|---|---|---|
| JP | 2012046399 | 3/2012 |

OTHER PUBLICATIONS

Antje Widmann et al., Structure, insertion electrochemistry, and magnetic properties of a new type of substitutional solid . . . , Inorganic Chemistry, 41(2002), 5706-5715.
Colin D. Wessells, Rober A. Huggins, Yi Cui, Copper hexacyanoferrate battery electrodes with long cycle life and high power, Nature Communication, 2( 2011) 550.

(Continued)

*Primary Examiner* — Zulmariam Mendez
(74) *Attorney, Agent, or Firm* — Law Office of Gerald Maliszewski; Gerald Maliszewski

(57) ABSTRACT

A method is provided for forming a metal-ion battery electrode with large interstitial spacing. A working electrode with hexacyanometallate particles overlies a current collector. The hexacyanometallate particles have a chemical formula $A_mM1_xM2_y(CN)_6 \cdot zH_2O$, and have a Prussian Blue hexacyanometallate crystal structure, where A is either alkali or alkaline-earth cations. M1 and M2 are metals with 2+ or 3+ valance positions. The working electrode is soaked in an organic first electrolyte including a salt including alkali or alkaline earth cations. A first electric field is created in the first electrolyte between the working electrode and a first counter electrode, causing A cations and water molecules to be simultaneously removed from interstitial spaces in the Prussian Blue hexacyanometallate crystal structure, forming hexacyanometallate particles having the chemical formula of $A_{m'}M1_xM2_y(CN)_6 \cdot z'H_2O$, where m'<m and z'<z, overlying the working electrode.

7 Claims, 7 Drawing Sheets

(56) References Cited

OTHER PUBLICATIONS

Collin D. Wessells et al., Nickel hexacyanoferrate nanoparticle electrodes for aqueous sodium and potassium ion batteries. Nano Letters, 11(2011), 5421-5425.

Ali Eftekhari, Potassium secondary cell based on Pruss ian blue cathode, Journal of Power Sources, 126 (2004)221-228.

U.S. Appl. No. 14/731,607, filed Jun. 5, 2015, Song et al.

U.S. Appl. No. 14/731,165, filed Jun. 4, 2015, Song et al.

Long Wang et al., "A Superior Low-Cost Cathode for a Na-ion Battery", Angewandte Chemie Intrnational Edition, vol. 52, No. 7.

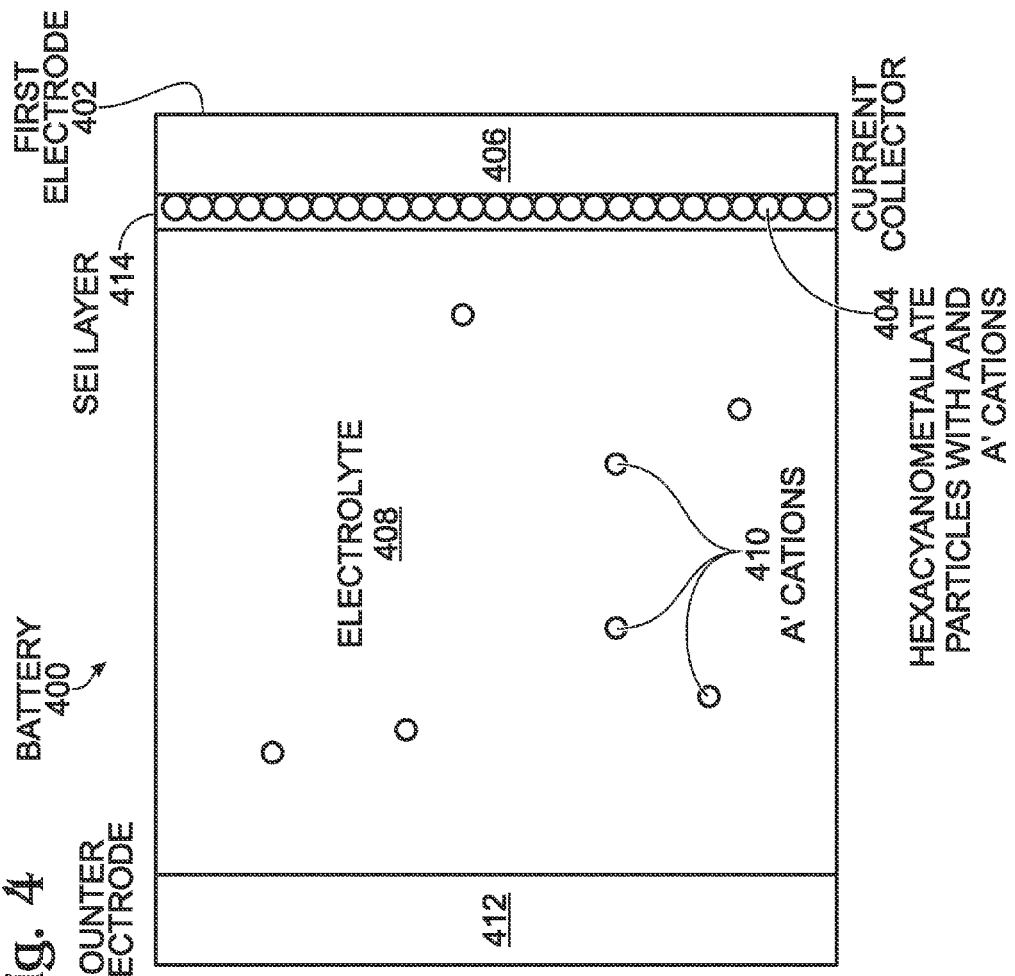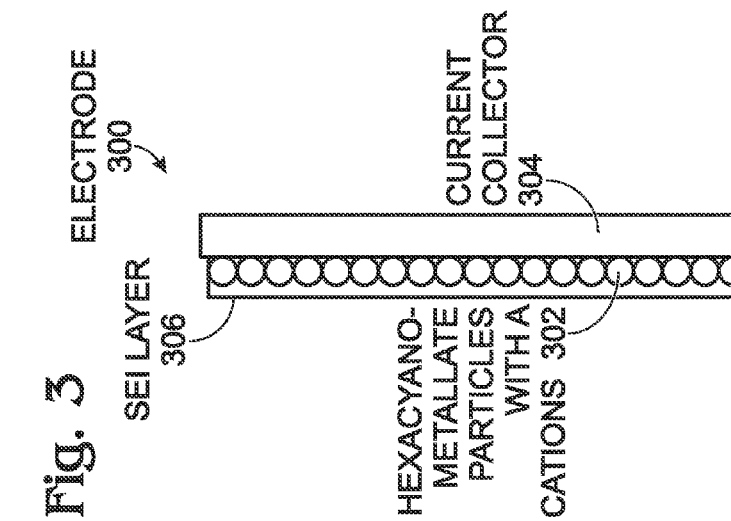

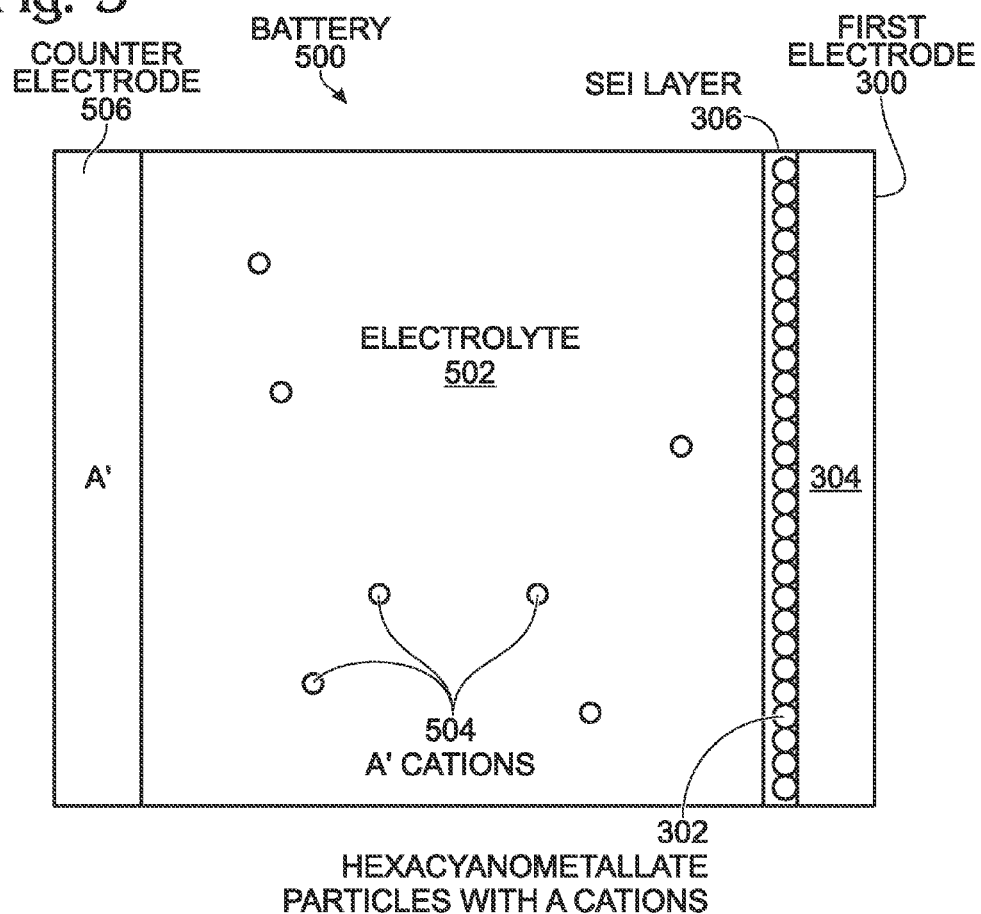
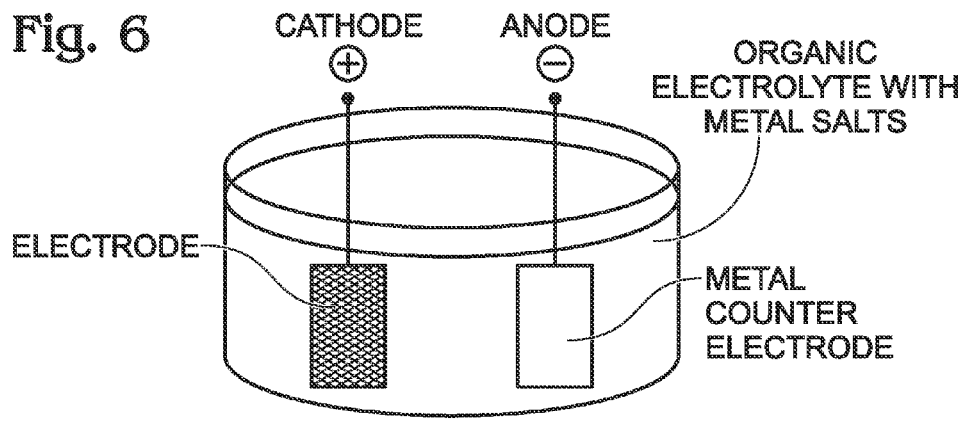

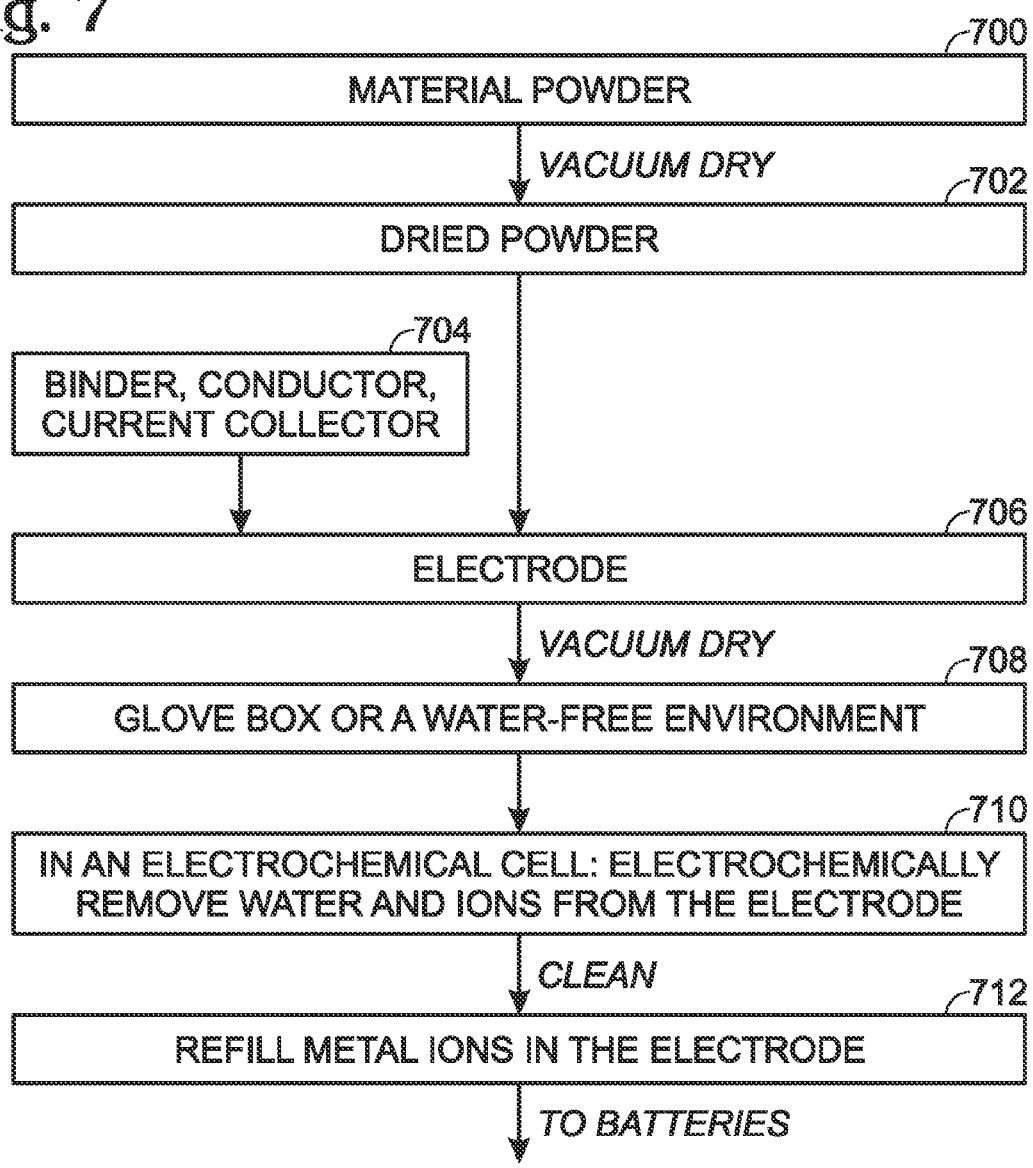

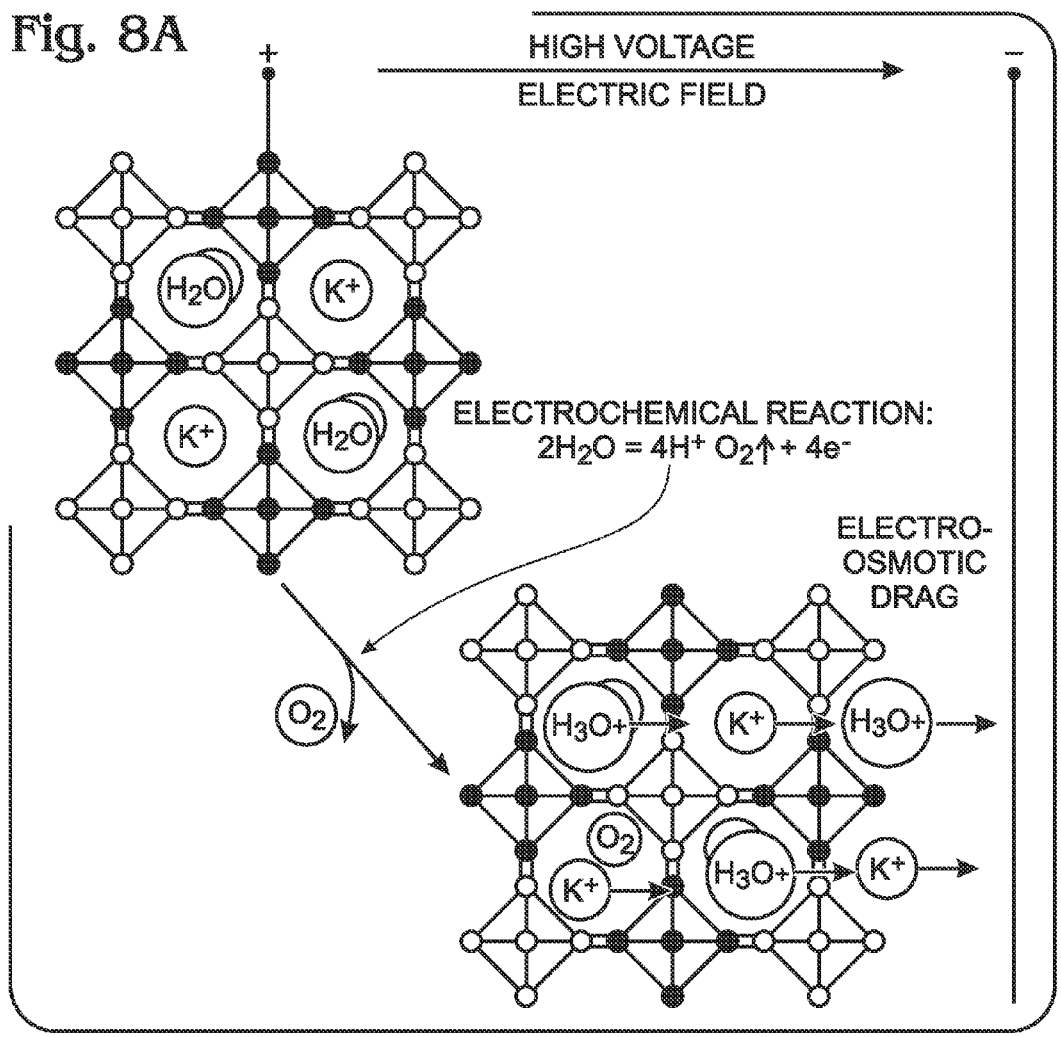
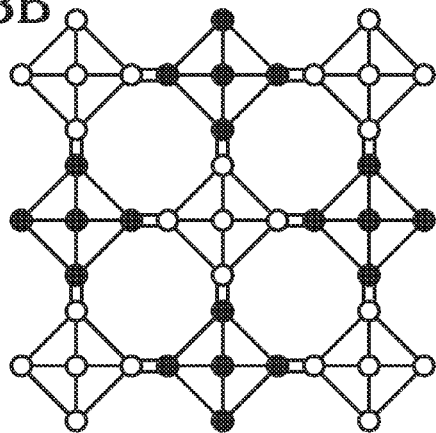

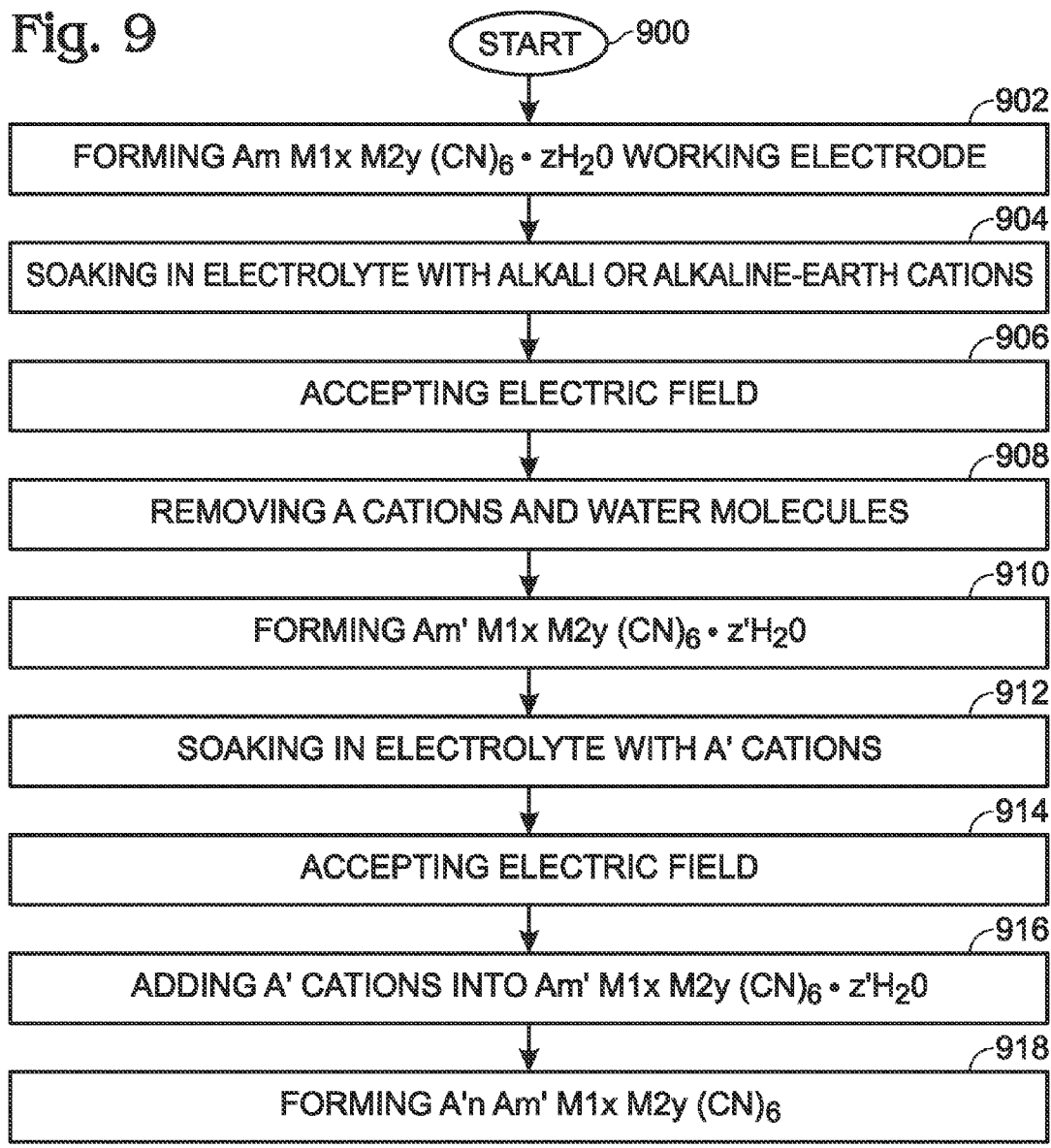

ELECTRODE FORMING PROCESS FOR METAL-ION BATTERY WITH HEXACYANOMETALLATE ELECTRODE

BACKGROUND OF THE INVENTION

1. Field of the Invention

This invention generally relates to batteries and, more particularly, to a metal-ion battery with large interstitial spacings.

2. Description of the Related Art

A battery is an electrochemical cell through which chemical energy and electric energy can be converted back and forth. The energy density of a battery is determined by its voltage and charge capacity. Lithium has the most negative potential of −3.04 V vs. $H_2/H^+$, and has the highest gravimetric capacity of 3860 milli-amp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) exchange between the positive and negative electrodes. Li-ion batteries have been referred to as rocking chair batteries because the lithium ions "rock" back and forth between the positive and negative electrodes as the cells are charged and discharged. The positive electrode (cathode) materials is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector, in the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a $Li^+$-ion, it has the smallest radius of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Al^{3+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

FIG. 1 depicts the framework for an electrode material with large interstitial spaces in a metal-ion battery (prior art). It is inevitable that the large interstitial spaces in these materials readily absorb water molecules and impure ions, as shown. Although these open spaces are very suitable for the intercalation of metal-ions with large sizes, the water molecules and impure ions degrade the electrochemical performance. In this example, Prussian blue analogues (PBs) with cubic framework have open "zeolytic" lattices that permit $Na^+/K^+$ ions to move easily and reversibly in the framework.

FIG. 2 demonstrates the crystal structure of Prussian blue and its analogues (prior art). Their general molecular formula is $AM1M2(CN)_6 \cdot zH_2O$, in which A is an alkali or alkaline-earth ion, and M1 and M2 are metal ions. The M1 and M2 metals are arranged in a three-dimensional checkerboard pattern, and shown in a two-dimensional pattern. The M1 ions are octahedrally coordinated to the nitrogen ends of the CN— groups, and the M2 ions to their carbon ends. The M1 and M2 ions are connected by the C≡N to form the Prussian blue framework with large interstitial spaces. The large interstitial sites may host the large sized alkali or alkaline-earth ions (A) and or zeolitic $H_2O$. The ion channels connecting the interstitial sites are similar in size to solvated alkali ions such as sodium and potassium, allowing rapid transport of these ions throughout the lattice. Therefore, PB is a good choice for an electrode material in sodium/potassium-ion batteries. Nonetheless, thermogravimetric analysis (TG) suggests that every PB molecule contains four water molecules. The occupation of water and impure ions in these materials definitely reduces the spaces to host the metal-ions and leads to the reduced capacity of these electrode materials. Therefore, $KCuFe(CN)_6$ has a theoretical capacity of 85.2 mAh/g, but its practical capacity is smaller than 60 mAh/g. In addition, water may react with the intercalated metal-ions and decrease the coulombic and energy efficiencies of the metal-ion batteries. Up to now, no method is reported to remove the water and impure ions from the large interstitial spaces of the hexacyanometallate electrode materials for metal-ions batteries. As a result, most metal-ions batteries with a hexacyanometallate electrode use an aqueous solution as an electrolyte. These batteries have small specific capacities and low voltages.

It would be advantageous if the aforementioned electrode forming problems could be addressed with a process to remove water and impure ions from the electrode material interstitial spaces. After such a process, the electrodes formed would be stable in a non-aqueous electrolyte, and metal-ion batteries made therefrom would have larger voltages and capacities.

SUMMARY OF THE INVENTION

Disclosed herein is an electrode material forming process. The electrode material formed has large interstitial spaces that can be used for the anode or cathode electrode of a metal-ion battery. The forming process removes the water molecules and impure ions from the electrode material, which increases the electrode material capacities and improves their coulombic and energy efficiencies. The process can be conducted in assembled batteries or in individual electrochemical cells before the battery assembly.

Accordingly, a method is provided for forming a metal-ion battery electrode with large interstitial spacing. The method forms a working electrode with hexacyanometallate particles overlying a current collector. The hexacyanometallate particles have a chemical formula $A_mM1_xM2_y(CN)_6 \cdot zH_2O$, and have a Prussian Blue hexacyanometallate crystal structure, where A is either an alkali or alkaline-earth cation. M1 is a metal with 2+ or 3+ valance positions. Likewise, M2 is a metal with 2+ or 3+ valance positions. The value of m is in the range of 0 to 2, x is in the range of 0.5 to 1.5, y is in the range of 0.5 to 1.5, and z is in a range of 0 to 10. The method soaks the working electrode in an organic first electrolyte including a salt including alkali or alkaline earth cations. A first electric field is created in the first electrolyte between the working electrode and a first counter electrode. In response to the first electric field, A cations and water molecules are simultaneously removed from interstitial spaces in the Prussian Blue hexacyanometallate crystal structure. As a result, hexacyanometallate particles are formed having a chemical formula of $A_{m'}M1_xM2_y(CN)_6 \cdot z'H_2O$, where m'<m and z'<z, overlying the working electrode.

In one aspect, subsequent to forming $A_mM1_xM2_y(CN)_6 \cdot z'H_2O$, the working electrode is soaked in an organic second electrolyte including a salt with A' cations, where A' includes either alkali or alkaline-earth cations. A second electric field is created in the second electrolyte between the working electrode and a second counter electrode including A' elements. In response to the second electric field, A' cations are added into the interstitial spaces of the $A_mM1_xM2_y(CN)_6 \cdot z'H_2O$ crystal structure. As a result, hexacyanometallate particles are formed with the chemical formula $A'_nA_mM1_xM2_y(CN)_6 \cdot z'H_2O$ overlying the metal current collector, where n is in a range of 0.5 to 2.

Additional details of the above-described process, and batteries fabricated using the process, and presented below.

BRIEF DESCRIPTION OF THE DRAWINGS

FIG. 3 is a partial cross-sectional view of a pre-fabricated metal-ion battery electrode with large interstitial spacing.

FIG. 4 is a metal-ion battery using an electrode with large interstitial spacing.

FIG. 5 is a partial cross-sectional view of another metal-ion battery using an electrode with large interstitial spacing.

FIG. 6 is a perspective view of an electrochemical cell that is used for an electrode forming process.

FIG. 7 is a flowchart illustrating a process that forms electrode materials for metal-ion batteries.

FIGS. 8A through 8D depict steps in an electrochemical cell electrode forming process.

FIG. 9 is a flowchart illustrating a method for forming a metal-ion battery electrode with large interstitial spacing.

DETAILED DESCRIPTION

Figure 1:
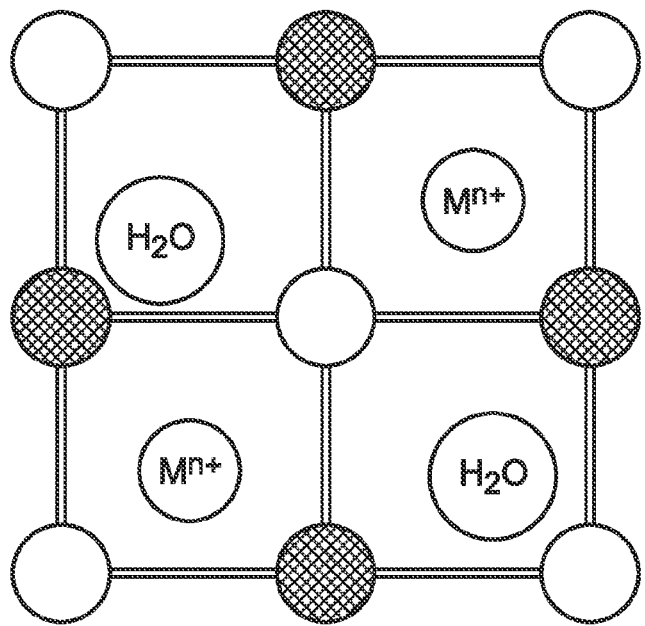
FIG. 1 depicts the framework for an electrode material with large interstitial spaces in a metal-ion battery (prior art).

FIG. 3 is a partial cross-sectional view of a pre-fabricated metal-ion battery electrode with large interstitial spacing. As described in more detail below (FIG. 5), such an electrode can be used in the fabrication of metal-ion batteries. The electrode 300 comprises hexacyanometallate particles 302 overlying a current collector 304. Hexacyanometallate indicates a compound containing metal and CN ligands. The current collector 304 may be metal. However, other materials such as carbon paper for example, have good electronic conductivity and can be used.

The hexacyanometallate particles may form a layer or multiple layers on current collector 304. As explained in more detail below, the hexacyanometallate particle layers may be mixed with carbon and use organic agent (PTFE, PVDF, etc.) to bind the particles together. In this figure, only one layer of hexacyanometallate particles is shown on current collector for simplicity, it should not be understood that the hexacyanometallate particles need necessarily forms a single layer.

The hexacyanometallate particles 302 have the chemical formula $A_mM1_xM2_y(CN)_6 \cdot z'H_2O$, and have a Prussian Blue hexacyanometallate crystal structure. The "A" symbol represents either alkali or alkaline-earth cations. For example, the A cations may be $Na^+$, $K^+$, $Mg^{2+}$, or $Ca^{2+}$. M1 is a metal having 2+ or 3+ valance positions. M2 is a metal having 2+ or 3+ valance positions. M1 and M2 may, or may not, be the same material. For example, M1 and M2 may be Cu, Fe, Co, Mn, Ni, Cr, Ti, Zn, Sn, or Cd. However, other metal materials may be enabling. The variables are as listed below:

m' is in the range of 0 to 2;
x is in the range of 0.5 to 1.5;
y is in the range of 0.5 to 1.5; and,
z' is in a range of 0 to 10.

In one aspect, the hexacyanometallate particles 302 have the chemical formula of $M1_xM2_y(CN)_6$, where m'=z'=0. In another aspect, as shown, a solid-electrolyte interphase (SEI) layer 306 overlies the working electrode 300.

FIG. 4 is a metal-ion battery using an electrode with large interstitial spacing. The battery 400 comprises a first electrode 402 with hexacyanometallate particles 404 overlying a current collector 406. The hexacyanometallate particles 404 have the chemical formula $A'_nA_mM1_xM2_y(CN)_6 \cdot z'H_2O$, and have a Prussian Blue hexacyanometallate crystal structure. The A cations may be either alkali or alkaline-earth cations. The A' cations are either alkali or alkaline-earth cations. For example, the A cations may be $Na^+$, $K^+$, $Mg^{2+}$, or $Ca^{2+}$. The A' cations may be $Na^+$, $K^+$, $Mg^{2+}$, or $Ca^{2+}$. The A and A' cations may, or may not be the same material. M1 is a metal having 2+ or 3+ valance positions. M2 is a metal having 2+ or 3+ valance positions. The M1 and M2 metals may, or may not be the same material. For example, M1 and M2 may be Cu, Fe, Co, Mn, Ni, Cr, Ti, Zn, Sn, or Cd. However, other metal materials may be enabling. The variables are as listed below:

m' is in the range of 0 to 2;
x is in the range of 0.5 to 1.5;
n is in the range of 0.5 to 2;
y is in the range of 0.5 to 1.5; and,
z' is in a range of 0 to 10.

In one aspect, the first electrode 402 hexacyanometallate particles have the chemical formula of $A'_nM1_xM2_y(CN)_6$, where m'=z'=0.

The battery 400 further comprises an organic electrolyte 408 including A' cations 410. In this case, the A' citations 410 are the same material as the A' citations in the first electrode 402. The battery 400 also includes a counter electrode 412. The counter electrode 412 may be made from a number of different materials, which may or may not include A' elements. For example, the counter electrode may be made from graphite, hard carbon, $NiCo_2O_4$, or $Ni_3S_2$, but other materials are possible. As shown, the battery 400 may further comprise a SEI layer 414 overlying the first electrode 402.

The first electrode 402 may be an anode, in which case the counter electrode 412 would be a cathode. Alternatively, the first electrode 402 may be a cathode, in which case the counter electrode 412 would be the anode.

In battery 400, A' cations are already present in the first electrode metal hexacyanometallate particles. As a result, the counter electrode does not have to have A' element, but the electrolyte needs salt with A' cations. While the first electrode with hexacyanometallate particles can be either cathode or anode, it is more typically a cathode because it typically has a higher positive potential than the A' metal.

FIG. 5 is a partial cross-sectional view of another metal-ion battery using an electrode with large interstitial spacing. The battery 500 uses the electrode of FIG. 3 as the first electrode. That is, the battery 500 comprises a first electrode 300 including hexacyanometallate particles 302 overlying a current collector 304. The hexacyanometallate particles 302 have the chemical formula $A_mM1_xM2_y(CN)_6 \cdot z'H_2O$, and have a Prussian Blue hexacyanometallate crystal structure. The A cations may be either alkali or alkaline-earth cations. For example, the A cations may be $Na^+$, $K^+$, $Mg^{2+}$, or $Ca^{2+}$. M1 is a metal having 2+ or 3+ valance positions. M2 is a metal having 2+ or 3+ valance positions. M1 and M2 may, or may not, be the same material. For example, M1 and M2 may be Cu, Fe, Co, Mn, Ni, Cr, Ti, Zn, Sn, or Cd. However, other metal materials may be enabling. The variables are as listed below:

m' is in the range of 0 to 2;
x is in the range of 0.5 to 1.5;
y is in the range of 0.5 to 1.5; and,
z' is in a range of 0 to 10.

The battery 500 includes an organic electrolyte 502 including a salt containing A' cations 504, which may be alkali or alkaline-earth cations. A counter electrode 506 comprises A' elements, where A' is either an alkali or alkaline-earth element. In this case, the A' cations 504 in the electrolyte 502 and A' elements in the counter electrode 506 are the same material. For example, the organic electrolyte A' cations may be $Na^+$, $K^+$, $Mg^{2+}$, or $Ca^{2+}$. The A and A' cations may, or may not be the same material.

In one aspect, the hexacyanometallate particles 302 have the chemical formula of $M1_xM2_y(CN)_6$, where m'=z'=0. In another aspect, as shown, a solid-electrolyte interphase (SEI) layer 306 overlies the first electrode 300.

The first electrode 300 may be an anode, in which case the counter electrode 506 would be a cathode. Alternatively, the first electrode 400 may be a cathode, in which case the counter electrode 504 would be the anode.

In battery 500, A' cations are used as the intercalation species during the charge/discharge cycling. Therefore, the electrolyte needs a salt with A' cations. Since the A' cations are not in the hexacyanometallate particles, the counter electrode must have A' elements, for example, a pure metal (e.g., sodium metal for a sodium ion battery), or an alloy (e.g., Na—Sn alloy for a sodium ion battery). The first electrode with hexacyanometallate particles can be either cathode or anode, but is more typically a cathode. The counter electrode with a pure metal or metal alloy is more typically an anode.

Functional Description

FIG. 6 is a perspective view of an electrochemical cell that is used for an electrode forming process. In a first step of the forming process, an electrochemical cell consists of a metal-ion host material electrode as the working electrode, a counter electrode, and the electrolyte with a metal-ion salt. For example, in the process of forming PBs electrode materials for the sodium-ion batteries, the cell uses the PBs as the working electrode, sodium metal as the counter electrode, and a non-aqueous solution with ethylene carbonate (EC), diethyl carbonate (DEC), and sodium perchlorate ($NaClO_4$) as the electrolyte. In this electrochemical cell configuration, sodium ion and metal are used in electrolyte and counter electrode, respectively. If an assembled battery has a similar structure to the cell, it can be used directly to conduct the forming process. In this case, the products generated in the forming process stay in the battery and may affect the battery performance. In another example of forming PBs electrode materials for sodium-ion batteries, the cell uses the PBs as the working electrode, platinum metal as the counter electrode, and an organic electrolyte contains ethylene carbonate (EC), diethyl carbonate (DEC), and $LiPF_6$ salt. In this electrochemical cell configuration, sodium ion and metal are not used in the first step forming process. In the following description, it is clear that the sodium intercalation into the PB lattice is not occurring at the first step forming process.

The first step of the forming process is to drive the A cations, impure ions, and water out of the hexacyanometallate lattice. In the first step of the forming process, an external voltage is applied to the two electrodes, with the working electrode having a higher potential than the counter electrode. The forming process is driven by electrochemical reaction and any form of controlled voltage and current signals can be applied to the process, such as constant voltage/current, pulse voltages with triangle or square form, and so on. The process can use a controlled voltage/current signal or a combination of several different signals to achieve an optimal condition to form the electrode materials.

Electrochemical reactions take place during the forming process. Above the voltage of water decomposition, water forms protons and oxygen. The reaction is: $2H_2O=4H^+ + O_2\uparrow + 4e^-$.

Proton ($H^+$) combines with water ($H_2O$) to form hydrated cation ($H_3O^+$). Protons and hydrated cations can be extracted out from the interstitial spaces of the electrode materials by an electric field. Meanwhile, oxygen can be expelled out from the spaces as well. The residual oxygen in the spaces can react with metal-ions reversibly to improve the capacities of the electrode materials.

After water and impure ions are removed from the interstitial spaces of the electrode materials, the metal-ions can be filled back to the interstitial spaces of the electrode materials. The metal-ions intercalate to the electrode material for the battery cycling process. This is the second step of forming process.

After the first electrode forming process, ideally the PB has the chemical formula of [$Fe_2(CN)_6$] or $Fe_4[Fe(CN)_6]_5$. A metal-ion battery with PB electrode chemical formula of $Fe_2(CN)_6$ is only possible to make if the counter electrode has been stuffed with the metal-ions. It is not practical to make a PB/carbon battery because there is no a sodium source in a PB/carbon battery (this is not actually a battery, because it has no capacity in this configuration).

For the second step of the electrode forming process, the electrochemical cell configuration is similar to FIG. 6. The electrochemical cell consists of a metal-ion host material electrode as the working electrode, a corresponding metal as the counter electrode, and the electrolyte with a corresponding metal-ion salt, as shown. For example, in the process of forming PBs electrode materials for the sodium-ion batteries, the cell uses the PBs as the working electrode, sodium metal as the counter electrode, and a non-aqueous solution with ethylene carbonate (EC), diethyl carbonate (DEC), and sodium perchlorate ($NaClO_4$) as the electrolyte. During the second step forming process, the working electrode has lower potential than the counter electrode. The forming process is driven by electrochemical reaction and any form of controlled voltage and current signals can be applied to the process, such as constant voltage/current, pulse voltages with triangle or square form, and so on. The process can use a controlled voltage/current signal or a combination of several different signals to achieve an optimal condition to form the electrode materials. In this case, the sodium ions are inserted into the PB lattice. In an ideal case, the PB has the chemical formula of $Na_2Fe_2(CN)_6$ after the second electrode forming process. After the second forming process, this sodium-ion battery (PB(Na)/carbon) has a good capacity.

During the forming process, solid-electrolyte interphase (SEI) layers can form on the surface of the electrode materials. Since this SEI layer is formed before the battery assembly, the battery capacity can be preserved. In the case that the battery is assembled with electrodes without the SEI layer, the SEI layer is created after the first charge/discharge cycle. For example in a Li-ion battery, the SEI layer is a Li—C—O compound. Since the SEI layer consumes the Li ions in the assembled cell, it degrades the Li-ion battery capacity. There is no such forming process, as described above, for Li-ion batteries. Therefore, the SEI layer in a Li-ion battery, which is Li—C—O compound, degrades the Li-ion battery capacity.

The initial SEI layer is very important to battery performance. As a result, manufacturers usually control SEI formation at the factory by cycling the battery in controlled conditions before they ship the battery. In the forming process described herein, the SEI layers are formed during this electrode forming process, prior to the battery assembly. Thus, the SEI formation process that must be performed with conventional (i.e. Li-ion) battery assembly can be skipped with the forming process described herein.

Alternatively stated, SEI layers are very important for the metal-ion batteries. They can hinder the reaction between the electrode materials and electrolyte, which improves the safety of the batteries. However, the formation of an SEI layer exhausts metal-ions from the electrode materials and decreases their capacities. The process of forming electrode materials described herein causes SEI layers to form on the electrode materials before they are assembled into all-ion metal-ion batteries. Therefore, the capacities of the electrode materials are not degraded as a result of SEI formation in batteries, as is the case with Li.

Water removal for these materials makes it possible to fabricate a non-aqueous electrolyte metal-ion battery. The use of the non-aqueous electrolyte in metal-ion batteries increases their voltages and power densities significantly. The existence of water deteriorates the performance of the non-aqueous electrolyte. For example, water decreases the decomposition voltage of the electrolyte, and the products generated from the decomposition contaminate the electrolyte and degrade the battery performance.

The forming process improves the capacities of the electrode materials, increases the efficiencies of the batteries, and stabilizes the performance of the batteries. The removal of water and impure ions empties the interstitial spaces for hosting metal-ions, which increases the charge capacities for the electrode materials. The forming process removes the unstable component (e.g., $H_2O$) in the metal-ion batteries and improves their coulombic and energy efficiencies. Moreover, the electrode materials are stabilized after the forming process.

FIG. 7 is a flowchart illustrating a process that forms electrode materials for metal-ion batteries. After the electrode materials are synthesized in Step 700, physical processes are employed to remove water from them initially, creating a dried powder (Step 702). The physical processes include vacuum drying, water extraction by organic solutions, super-critical water extraction, and so on. The dried materials introduced in Step 704 are mixed with a binder (PTFE, PVDF, etc.) in Step 706 and with an electronic conductor powder (e.g., carbon black) in low boiling point solvent to form a paste. The paste is coated on a metal foil or mesh (Al, Cu, Ti, Ni, C, etc.) that is used as the current collector for the electrode.

More explicitly, a dried $A_xM_1M_2(CN)_6$ (A=Na, K, Mg, or Ca) powder with particle size of 5 nm-1 μm is mixed with a binder (PTFE, PVDF, etc.) and the electronic conductor powder (carbon black, carbon nanotube, carbon nanowire, grapheme, etc., with particle size of 5 nm-1 μm) in low boiling point solvent to form a paste. $A_xM_1M_2(CN)_6$ (A=Na, K Mg, or Ca) powder contains crystal water even after the drying process. The water is not shown in the formula. The composition of the paste is 70 wt. % 95 wt. % $A_xM_1M_2(CN)_6$, 0 wt. %-30 wt. % electronic conductor powder, and 1 wt. %-15 wt. % hinder. The paste is coated on a metal foil or mesh (Al, Ti, etc.) that is used as the current collector for the positive electrode. After drying, the electrode undergoes forming process.

After drying, the electrode is immersed in an electrochemical cell as the working electrode in a water-free environment (Step 708). The electrochemical also includes a metal counter electrode and any organic electrolyte salt as shown in FIG. 6.

The forming process includes two steps: the first step (Step 710) is to remove the ions $(A_x)$ and residual water from the $A_xM_1M_2(CN)_6$ lattice. The second step (Step 712) is to fill Na-ions, K-ions, Mg-ions, or Ca-ions into the $A_xM_1M_2(CN)_6$ lattice. The Na ions and K ions (Mg ions and Ca ions) occupy the A site and these ions are moving in/out of the $A_xM_1M_2(CN)_6$ lattice during the discharge/charge cycles.

After the electrode is fully soaked by the electrolyte, Step 710 applies a signal of voltage/current, or combined signals are applied to the cell. The signal input is determined by the system in which the process of forming electrode can be carried out at an optimal condition. The signal input creates an electric field. The particles with electrical charge in the electrochemical cell move along the electric field due to the electro-osmotic drag. If the direction of the electric field is from the working electrode to the metal counter electrode, the positively charged particles in the interstitial spaces of the electrode materials can be dragged out from the lattice.

In the case of water molecules in the lattice, the electrochemical reaction, $2H_2O=4H^++O_2\uparrow+4e^-$, takes place once the cell voltage is higher than that of water decomposition potential. Protons ($H^+$) can react with the water molecules and form the hydrated cations ($H_3O^+$). Therefore, protons ($H^+$), hydrated cations ($H_3O^+$), and impure ions (e.g., $K^+$) move along the electric field and are eventually dragged out from the host structure lattice. Oxygen molecules produced in this electrochemical reaction can also be expelled out from the interstitial spaces of the electrode materials. Even if the oxygen molecules remain in the host lattice, they do not deteriorate the performance of the electrode materials. On the contrary, oxygen is an active material and can be considered as an oxygen electrode. Oxygen reacts with the metal-ions reversibly, and this reversible reaction contributes to the capacities of the electrode materials for the metal-ion batteries. After the first electrode forming step (Step 710) that removes the water and impure ions from the electrode materials, the electrode material lattice has clean interstitial spaces that can host more metal-ions for the metal-ion battery. Moreover, if the Fermi energies of the electrode materials are lower than the highest unoccupied molecule orbit (HOMO) energy of the electrolyte, metal-ion permeable SEI layers form on the surface of the materials. The SEI layers restraint the reactions between the electrode materials and the electrolyte further.

After the first forming process to "clean" the electrode material lattice, the metal ions are not yet in the material lattice. In order to make a metal-ion (e.g., Na-ion) battery, this "clean" electrode has to pair with a counter electrode with a metal ion (e.g., Na-ion) inside the lattice. The other way to pair this "clean" electrode is to use a metal electrode (e.g., Na electrode) or alloy electrode (e.g., NaSn). However, it may be undesirable to use a pure metal or an alloy in battery fabrication because of safety issues, and because battery assembly would have to be performed in inert atmosphere. Therefore, it is desirable to insert metal-ions into the "clean" and "empty" lattice (Step 712) and these metal-ions can be used as the "shuttle" during the battery charge/discharge process. Step 712 is referred to as the second electrode forming process.

A fresh electrolyte is suggested for this second electrode forming process. A reverse electric field is applied to the electrochemical cell, and the positively charged metal-ions are inserted into the electrode material in response to the electric field. Similarly, the SEI layers form on the surface of the electrode materials once their Fermi energies are higher than the lowest unoccupied molecule orbit (LUMO) energy of the electrolyte. For a sodium ion battery, the electrochemical cell for the second electrode forming process has the following configuration: the working electrode is the electrode created in the first electrode forming process (Step 710), the electrolyte contains organic solvent and sodium salt, the counter electrode contains sodium metal, and the electric field direction is from counter electrode to working electrode. Upon receiving the electrical field, the Na in the counter electrode dissolves in electrolyte and is inserted into working electrode lattice.

Electrode materials formed as described above have several interesting features: (1) water and impure ions are removed from their interstitial spaces; (2) the materials can provide metal-ion sources for the metal-ions batteries; (3) the electrode materials can be used in the non-aqueous electrolyte metal-ion batteries; (4) SEI layers may form on the surface of the electrode materials to restrain reactions with non-aqueous electrolyte; (5) the electrode materials have higher capacities than before; and, (6) the electrode materials have very stable properties.

Figure 2:
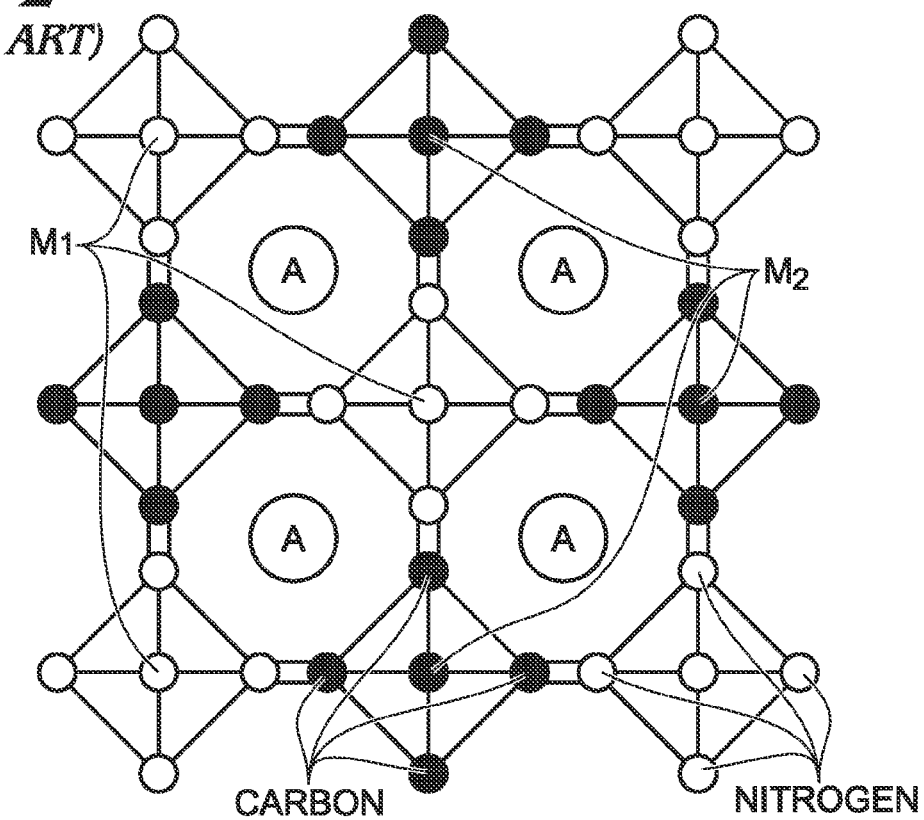
FIG. 2 demonstrates the crystal structure of Prussian blue and its analogues (prior art).

FIGS. 8A through 8D depict steps in an electrochemical cell electrode forming process. An example using PB as the electrode in sodium-ion batteries is provided to illustrate the electrode material forming process. PB has the formula of $KFe(II)Fe(III)(CN)_6$, and the molecular structure is shown in FIG. 2. The $H_2O$ molecule and $K^+$ ions are stuffed in the interstitial space as shown in FIG. 2. In the forming process setup, the working electrode is fabricated with PB powder mixed with a binder and carbon conductor. The PB electrode is placed into an electrochemical cell as the working electrode. The electrolyte is an EC:DEC (vol;vol=1:1) solution with saturated $NaClO_4$. Sodium metal is the counter electrode. Although sodium metal and $NaClO_4$ salt are use in this example, it is not necessary to use counter electrode and metal salt contain sodium for this step of forming process. Due to the potential of $Na/Na^+$ (−2.71 V vs. $H_2/H^+$), the water decomposition potential is 3.94 V in the electrochemical cell. An electric field is applied in the cell, from the working electrode to the counter electrode, moving the positively charged $K^+$-ions in the interstitial spaces PB electrode. Once the potential of the PB electrode is higher than 3.94 volts, water molecules inside the PB lattice decompose and form the protons and oxygen. The protons combine with water and form the positively charged hydrated cations. Similar to the behavior of $K^+$-ions, the protons and hydrated cations move out from the PB electrode by electro-osmotic drag. At the same time, the oxygen is expelled out from the electrode. The step is described in FIG. 8A.

Water and $K^+$-ions removal from the PB electrode increases the free-interstitial spaces in the PB electrode as shown in FIG. 8B. As a cathode material in a sodium ion battery, the PB electrode has to have a sodium-ion source. After the PB electrode is washed several times by dimethyl carbonate (DMC) or DEC and dried, the cleaned electrode is placed into another electrochemical cell with the fresh electrolyte ($NaClO_4$ in EC:DEC) and sodium counter electrode. Note that it is not necessary to use counter electrode and metal salt contain sodium for this step of forming process.

Figure 8C:
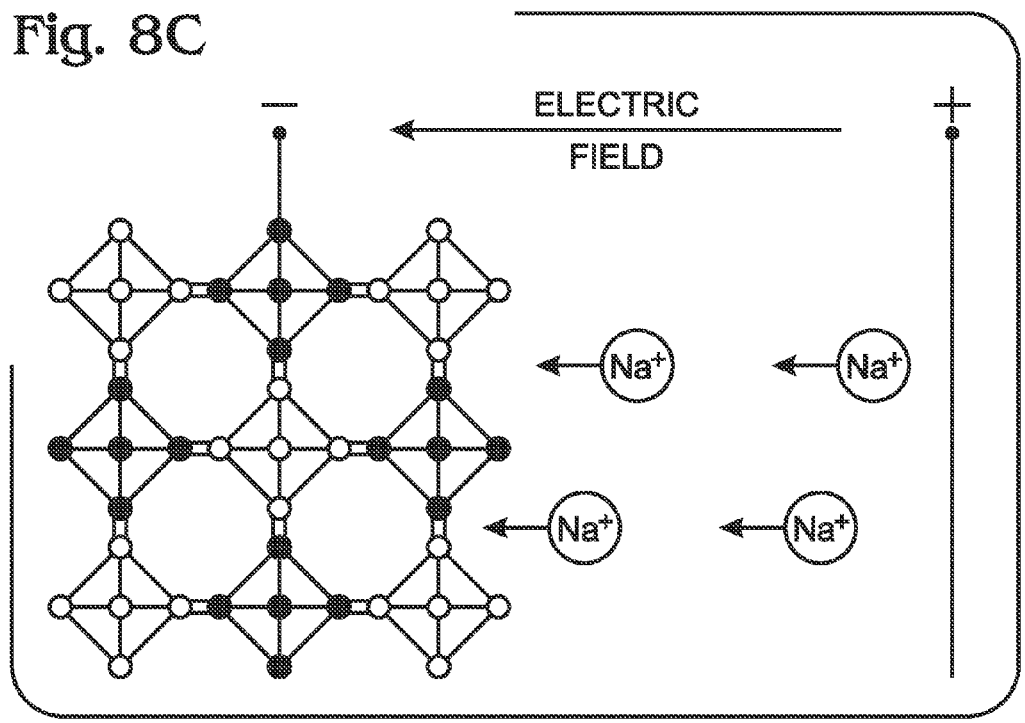
Figure 8D:
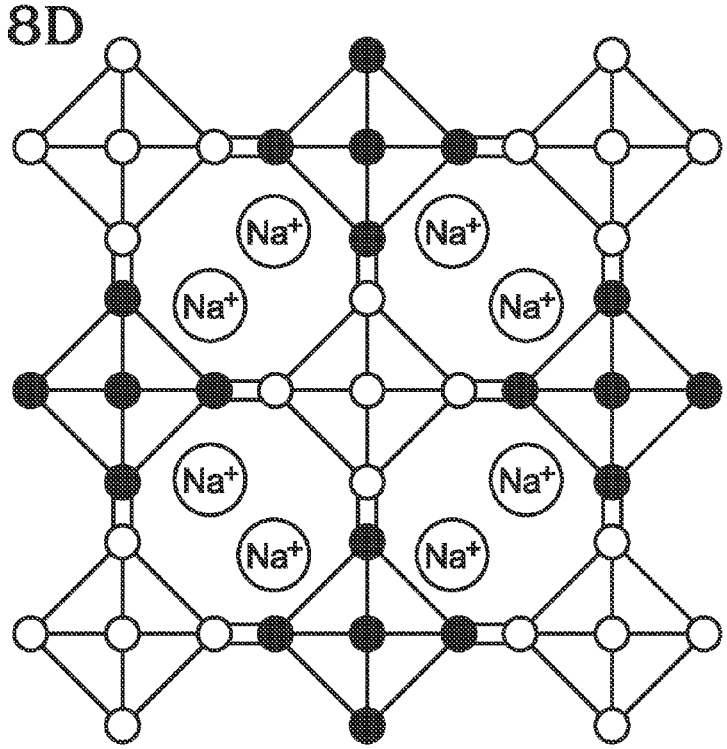

In FIG. 8C a reverse electric field is exerted on the electrochemical cell, and the sodium counter electrode dissolves gradually into the electrolyte, becoming $Na^+$-ions. The $Na^+$-ions pass though the electrolyte and are inserted into the PB electrode. The PB electrode is washed by DMC or DEC and dried several times, and then it is ready for assembly in a sodium-ion battery using a nonmetal anode electrode. FIG. 8D depicts a fully $Na^+$-filled PB electrode.

As for the electrolyte of EC/DEC, its decomposition potential is around 4.0 volts. If the applied voltage is higher than 4V, layers of sodium carbonates may form on the surface of the PB electrode. This layer is called an SEI layer. The SEI layer is $Na^+$ permeable, but it blocks further reaction between the PB electrode and electrolyte.

The whole process can be conducted in an assembled battery as well. For example, after a PB/Na battery is assembled, it is charged to 4.5V in a first step. Water in the PB electrode decomposes to oxygen and protons. Under the effect of electric field, $K^+$-ions, protons, and hydrated cations move out from the PB electrode. The capacity of the $KFe_2(CN)_6$ in the sodium battery is 120 mAh/g at the 3rd cycle if the above-described PB electrode forming process is performed, but the capacity is only 90 mAh/g at the 3rd cycle if the electrode forming process is not used. That is the battery is discharged first, inserting $Na^+$ ions into the "non-cleaned" PB lattice. The disadvantage for the kind of forming process is that $K^+$ and $H^+$ ions remain in the battery, which may affect its performance.

FIG. 9 is a flowchart illustrating a method for forming a metal-ion battery electrode with large interstitial spacing. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 900.

Step 902 forms a working electrode with hexacyanometallate, particles overlying a current collector. The hexacyanometallate particles have a chemical formula $A_mM1_xM2_y(CN)_6 \cdot zH_2O$, and have a Prussian Blue hexacyanometallate, crystal structure. "A" is either an alkali or alkaline-earth cation. For example, the A cations may be $Na^+$, $K^+$, $Mg^{2+}$, or $Ca^{2+}$. M1 is a metal with 2+ or 3+ valance positions. Likewise. M2 is a metal with 2+ or 3+ valance positions. The variables are as follows:

m is in the range of 0 to 2;
x is in the range of 0.5 to 1.5;
y is in the range of 0.5 to 1.5; and,
z is in a range of 0 to 10.

Step 904 soaks the working electrode in an organic first electrolyte including a salt with either alkali or alkaline earth cations. Step 906 accepts a first electric field in the first electrolyte between the working electrode and a first counter electrode. In response to the first electric field, Step 908 simultaneously removes A cations and water molecules from interstitial spaces in the Prussian Blue hexacyanometallate crystal structure. Step 910 forms hexacyanometallate particles having a chemical formula of $A_{m'}M1_xM2_y(CN)_6 \cdot z'H_2O$, where m'<m and z'<z, overlying the working electrode. In one aspect, Step 910 forms hexacyanometallate particles having the chemical formula of $M1_xM2_y(CN)_6$, where m'=z'=0.

In one aspect, simultaneously removing A cations and water molecules from interstitial spaces in the Prussian Blue hexacyanometallate crystal structure in response to the first electric field in Step 908 includes forming a solid-electrolyte interphase (SEI) layer overlying the working electrode.

In another aspect, the method continues with Step 912. Subsequent to forming $A_{m'}M1_xM2_y(CN)_6 \cdot z'H_2O$, Step 912 soaks the working electrode in an organic second electrolyte including a salt with A' cations, where A' is either an alkali or alkaline-earth cation. For example, the A' cations may be $Na^+$, $K^+$, $Mg^{2+}$, or $Ca^{2+}$. The A' cations in the second electrolyte may be the same material as the A cations (in the working electrode) or a different material than the A cations. Step 914 accepts a second electric field in the second electrolyte between the working electrode and a second counter electrode including A' elements. In response to the second electric field, Step 916 acids A' cations into the interstitial spaces of the $A_mM1_xM2_y(CN)_6 \cdot z'H_2O$ crystal structure. Step 918 forms hexacyanometallate particles with the chemical formula $A'_nA_m'M1xM2y(CN)_6$ overlying the metal current collector, where n is in a range of 0.5 to 2.

In one aspect, soaking the working electrode in an organic second electrolyte (Step 912), and accepting the second electric field in the second electrolyte between the working electrode and the second counter electrode (Step 914) includes soaking the working electrode in an assembled battery. If the second counter electrode is an anode, the working electrode functions as a cathode. Otherwise, if the second counter electrode is a cathode, the working electrode is an anode. The second electric field inserts A' cations into the interstitial spaces of the $A_mM1_xM2_y(CN)_6 \cdot z'H_2O$ crystal structure.

A metal-ion battery and associated electrode forming process have been provided. Examples of chemical elements have been presented to illustrate the invention. However, the invention is not limited to merely these examples. Other variations and embodiments of the invention will occur to those skilled in the art.

We claim:

1. A method for forming a metal-ion battery electrode with large interstitial spacing, the method comprising:

forming a working electrode with hexacyanometallate particles overlying a current collector, the hexacyanometallate particles having a chemical formula $A_mM1_xM2_y(CN)_6 \cdot zH_2O$, and having a Prussian Blue hexacyanometallate crystal structure, where A is selected from a group consisting of alkali and alkaline-earth cations;

where M1 is a metal selected from a group consisting of 2+ and 3+ valance positions;

where M2 is a metal selected from a group consisting of 2+ and 3+ valance positions;

where m is in a range of 0 to 2;

where x is in a range of 0.5 to 1.5;

where y is in a range of 0.5 to 1.5;

where z is in a range of 0 to 10;

soaking the working electrode in an organic first electrolyte including a salt selected from the group consisting of alkali and alkaline earth cations;

accepting a first electric field in the first electrolyte between the working electrode and a first counter electrode;

in response to the first electric field, simultaneously removing A cations and water molecules from interstitial spaces in the Prussian Blue hexacyanometallate crystal structure;

forming hexacyanometallate particles having a chemical formula of $A_{m'}M1_xM2_y(CN)_6 \cdot z'H_2O$, where m'<m and z'<z, overlying the working electrode;

subsequent to forming $A_{m'}M1_xM2_y(CN)_6 \cdot zH_2O$, soaking the working electrode in an organic second electrolyte including a salt with A' cations, where A' is selected from a group consisting of alkali and alkaline-earth cations;

accepting a second electric field in the second electrolyte between the working electrode and a second counter electrode including A' elements;

in response to the second electric field, adding A' cations into the interstitial spaces of the $A_mM1_xM2_y(CN)_6 \cdot zH_2O$ crystal structure; and, forming hexacyanometallate particles with the chemical formula $A'_nA_mM1_xM2_y(CN)_6 \cdot z'H_2O$ the metal current collector, where n is in a range of 0.5 to 2.

2. The method of claim 1 wherein soaking the working electrode in the second electrolyte including a salt with A' cations includes the A' cations being selected from a group consisting the same material as the A cations and a different material other than the A cations.

3. The method of claim 1 wherein forming hexacyanometallate particles having the chemical formula of $A_mM1_xM2_y(CN)_6 \cdot z'H_2O$ includes forming hexacyanometallate particles having the chemical formula of $M1_xM2_y(CN)_6$, where m'=z=0.

4. The method of claim 1 wherein the A cations are selected from a group consisting of $Na^+$, $K^+$, $Mg^{2+}$, and $Ca^{2+}$.

5. The method of claim 1 wherein the A' cations are selected from a group consisting of $Na^+$, $K^+$, $Mg^{2+}$, and $Ca^{2+}$.

6. The method of claim 1 wherein simultaneously removing A cations and water molecules from interstitial spaces in the Prussian Blue hexacyanometallate crystal structure in response to the first electric field includes forming a solid-electrolyte interphase (SEI) layer overlying the working electrode.

7. The method of claim 1 wherein soaking the working electrode in an organic second electrolyte, and accepting the second electric field in the second electrolyte between the working electrode and the second counter electrode includes soaking the working electrode in an assembled battery, where the second counter electrode is selected from a group consisting of an anode and a cathode, the working electrode is unselected from the group, and the second electric field inserts A' cations into the interstitial spaces of the $A_mM1_xM2_y(CN)_6 \cdot z'H_2O$ crystal structure.

* * * * *

UNITED STATES PATENT AND TRADEMARK OFFICE
CERTIFICATE OF CORRECTION

Page 1 of 1

PATENT NO. : 9,269,953 B2
APPLICATION NO. : 13/432993
DATED : February 23, 2016
INVENTOR(S) : Yuhao Lu and Jong-Jan Lee It is certified that error appears in the above-identified patent and that said Letters Patent is hereby corrected as shown below:

Claims

In column 12, at line 4 (claim 1), the term --$z'$-- has been incorrectly printed as --$z$--.

In column 12, at line 14 (claim 1), the term --$z'$-- has been incorrectly printed as --$z$--.

In column 12, at line 29 (claim 1), the term --$m'=z'=0$-- has been incorrectly printed as --$m'=z=0$--.

Signed and Sealed this
Third Day of May, 2016

Michelle K. Lee
*Director of the United States Patent and Trademark Office*